(12) United States Patent
Kojima et al.

(10) Patent No.: US 12,368,336 B2
(45) Date of Patent: Jul. 22, 2025

(54) ROTARY ELECTRIC MACHINE

(71) Applicant: SUBARU CORPORATION, Tokyo (JP)

(72) Inventors: Haruka Kojima, Tokyo (JP); Nobuhiko Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 296 days.

(21) Appl. No.: 17/693,944

(22) Filed: Mar. 14, 2022

(65) Prior Publication Data

US 2022/0320938 A1 Oct. 6, 2022

(30) Foreign Application Priority Data

Mar. 31, 2021 (JP) ................................ 2021-060305

(51) Int. Cl.
*H02K 3/28* (2006.01)
*H02K 1/16* (2006.01)
(Continued)

(52) U.S. Cl.
CPC ................. *H02K 3/28* (2013.01); *H02K 1/16* (2013.01); *H02K 3/14* (2013.01)

(58) Field of Classification Search
CPC .. H02K 1/16; H02K 3/14; H02K 3/28; H02K 3/04; H02K 3/12; H02K 3/46; H02K 3/48; H02K 3/50
(Continued)

(56) References Cited

U.S. PATENT DOCUMENTS 4,833,356 A * 5/1989 Bansal ................. H02K 3/12
                                                      310/71
6,201,332 B1 * 3/2001 Umeda ................. H02K 3/12
                                                      310/179
(Continued)

FOREIGN PATENT DOCUMENTS

JP   2014-204597 A   10/2014
JP   2015-119535 A    6/2015
(Continued)

OTHER PUBLICATIONS

Japanese Office Action JPA No. 2021-060305 issued on Nov. 12, 2024 with English translation thereof.

*Primary Examiner* — Burton S Mullins
(74) *Attorney, Agent, or Firm* — MCGINN I.P. LAW GROUP, PLLC (57) ABSTRACT

A rotary electric machine includes a stator and a rotor. The stator includes a stator core, coils, and a power line. The stator core includes slots. The coils are individually inserted in the slots and attached to the stator core. The power line couples a power source to the coils. Each coil includes projections and insertion portions. The projections are opposite ends of the corresponding coil and project from the stator core. The insertion portions are portions of the corresponding coil and inserted in the slots. The coils include general coils and power-line coils. The projections of each general coil serve as a first coupler and a second coupler. The projections of each power-line coil serve as a power-line coupler and a general coupler. The power-line coils and at least one of the general coils are same in length. The power-line coupler is coupled to the power line.

7 Claims, 8 Drawing Sheets

(51) Int. Cl.
*H02K 3/04* (2006.01)
*H02K 3/12* (2006.01)
*H02K 3/14* (2006.01)

(58) Field of Classification Search
USPC .......................................................... 310/198
See application file for complete search history.

(56) References Cited

U.S. PATENT DOCUMENTS

| | | | | |
|---|---|---|---|---|
| 6,522,043 B2* | 2/2003 | Masegi | ............ | H02K 3/28 |
| | | | | 310/179 |
| 7,602,093 B2* | 10/2009 | Oowatari | ............ | H02K 9/06 |
| | | | | 310/58 |
| 7,622,843 B2* | 11/2009 | Cai | ............ | H02K 3/28 |
| | | | | 310/179 |
| 8,487,498 B2* | 7/2013 | Patel | ............ | H02K 3/505 |
| | | | | 310/184 |
| 8,716,910 B2* | 5/2014 | Edrington | ............ | H02K 3/50 |
| | | | | 310/179 |
| 9,735,659 B2* | 8/2017 | Koizumi | ............ | H02K 11/25 |
| 10,756,588 B2* | 8/2020 | Kawamura | ............ | H02K 3/12 |
| 10,923,978 B2* | 2/2021 | Shiah | ............ | H02K 1/165 |
| 10,965,178 B2* | 3/2021 | Tang | ............ | H02K 7/006 |
| 10,985,625 B2* | 4/2021 | Sheu | ............ | H02K 9/19 |
| 10,998,787 B2* | 5/2021 | Leonardi | ............ | H02K 15/024 |
| 11,056,954 B2* | 7/2021 | Liang | ............ | H02K 1/16 |
| 11,063,488 B2* | 7/2021 | Shin | ............ | H02K 3/28 |
| 11,081,922 B2* | 8/2021 | Ahmed | ............ | H02K 3/12 |
| 11,258,328 B2* | 2/2022 | Song | ............ | H02K 1/278 |
| 11,271,446 B2* | 3/2022 | Deng | ............ | H02K 1/165 |
| 11,309,761 B2* | 4/2022 | Ahmed | ............ | H02K 3/28 |
| 11,323,000 B2* | 5/2022 | Lin | ............ | H02K 3/12 |
| 11,418,070 B2* | 8/2022 | Aida | ............ | H02K 1/165 |
| 12,009,708 B2* | 6/2024 | Goto | ............ | H02K 15/35 |
| 2002/0096963 A1* | 7/2002 | Masegi | ............ | H02K 3/28 |
| | | | | 310/180 |
| 2014/0300237 A1 | 10/2014 | Tokizawa | | |
| 2019/0149003 A1 | 5/2019 | Ishikawa et al. | | |
| 2020/0067362 A1* | 2/2020 | Shiah | ............ | H02K 3/28 |
| 2020/0328646 A1* | 10/2020 | Miyawaki | ............ | H02K 3/28 |
| 2020/0381969 A1* | 12/2020 | Ahmed | ............ | H02K 3/505 |

FOREIGN PATENT DOCUMENTS

| | | | | |
|---|---|---|---|---|
| JP | 2015119535 | * | 6/2015 | ............ H02K 3/04 |
| WO | 2017-195481 A | | 11/2017 | |

* cited by examiner

ROTARY ELECTRIC MACHINE

CROSS-REFERENCE TO RELATED APPLICATIONS

The present application claims priority from Japanese Patent Application No. 2021-060305 filed on Mar. 31, 2021, the entire contents of which are hereby incorporated by reference.

BACKGROUND

The disclosure relates to a technical field of a rotary electric machine including a stator and a rotor rotatable relative to the stator.

A stator including a stator core and a plurality of coils attached to the stator core is known as a stator of a rotary electric machine (see, for example, Japanese Unexamined Patent Application Publication (JP-A) No. 2014-204597).

The stator of the rotary electric machine disclosed in JP-A No. 2014-204597 includes a stator core including a plurality of slots, and a plurality of conductor segments that constitute a stator winding. Each of the conductor segments is partly disposed in the slot, and part of the segment that projects from the stator core is coupled to another conductor segment.

SUMMARY

An aspect of the disclosure provides a rotary electric machine includes a stator, and a rotor rotatable relative to the stator. The stator includes a stator core, coils, and a power line. The stator core includes slots spaced in a circumferential direction. The coils are individually inserted in the slots and attached to the stator core. The power line is configured to couple a power source to the coils. Each of the coils includes projections and insertion portions. The projections are opposite ends of the each of the coil and project from the stator core. The insertion portions are portions of the each of the coil and inserted in corresponding ones of the slots. The coils include general coils and power-line coils. The projections of each of the general coils are configured to serve as a first coupler and a second coupler. The projections of each of the power-line coils are configured to serve as a power-line coupler and a general coupler. The power-line coils and at least one of the general coils are same in length. The power-line coupler is coupled to the power line. The first coupler, the second coupler, and the general coupler are bent from the insertion portions by respective bending amounts in accordance with a length of the power-line coupler, and are coupled to coupled to ones of the coils. The ones of the coils other than one of the general coils having the first coupler and the second coupler and one of the power-line coils having the general coupler.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 1, along with FIGS. 2 to 10, illustrates a rotary electric machine according to an embodiment of the disclosure.

DETAILED DESCRIPTION

Power from a power source is supplied to coils of a stator via a power line. For this reason, a plurality of the coils include general coils coupled to other coils and power-line coils coupled to the power line. Each of the power-line coils has one end coupled to the power line and has the other end coupled to the general coil. The one end coupled to the power line is to have a length in accordance with a length of a joint with the power line. In some cases, the length of the joint with the power line varies in accordance with a vehicle model and a configuration of a rotary electric machine, for example. Consequently, the power-line coil has a different length from that of the general coil. In this case, therefore, a plurality of kinds of coils having different overall lengths are to be molded individually, thus increasing the number of manufacturing steps and manufacturing cost of the rotary electric machine.

It is desirable to decrease the number of kinds of coils for use in a rotary electric machine so as to reduce the number of manufacturing steps and manufacturing cost.

Hereinafter, a rotary electric machine according to an embodiment of the disclosure will be described with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Schematic Configuration of Vehicle

Figure 1:
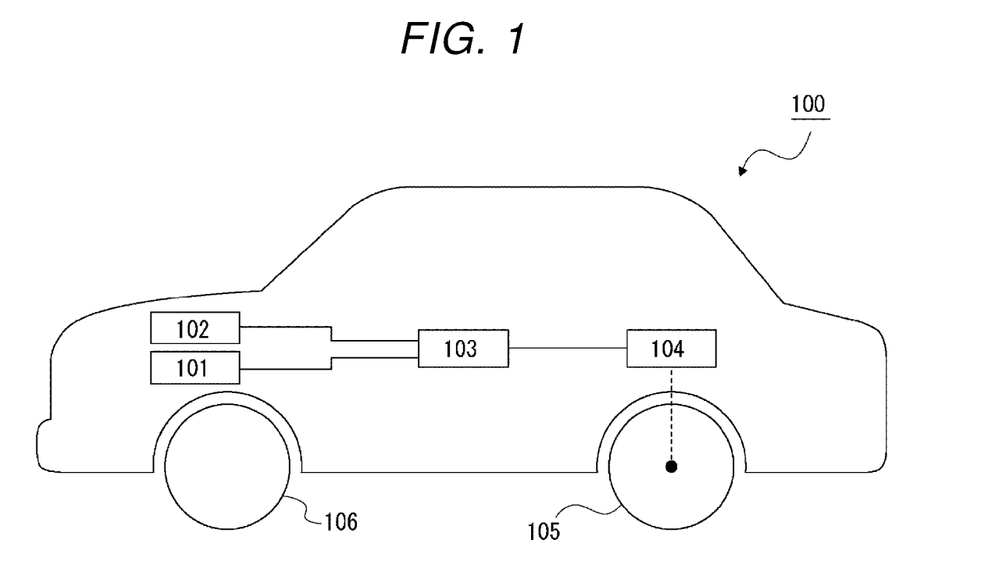
FIG. 1 is a diagram illustrating a schematic configuration of a vehicle.

First, a schematic configuration of a vehicle will be described (see FIG. 1).

A vehicle 100 is, for example, a hybrid electric vehicle and includes a rotary electric machine 101 and an engine (internal combustion engine) 102. A transmission 103 is coupled to the rotary electric machine 101 and the engine 102 with components such as torque converters and friction clutches, not illustrated. However, when the vehicle 100 is an electric vehicle, the engine 102 is not provided.

A differential device 104 is coupled to the transmission 103. The differential device 104 is, for example, a rear differential device. Left and right rear-wheel drive shafts, not illustrated, are coupled to the differential device 104. Rear wheels 105, 105 are individually coupled to the rear-wheel drive shafts. Driving forces from the rotary electric machine 101 and the engine 102 are transmitted to the rear wheels 105, 105 via the differential device 104 and the rear-wheel drive shafts.

The above description refers to the schematic configuration of the two-wheel drive (2WD) vehicle 100 having the rear wheels driven. However, in the case of a two-wheel drive (2WD) vehicle having front wheels driven or a four-wheel drive (4WD) vehicle, a front differential device is provided in place of or in addition to the differential device 104. When the front differential device is provided, left and right front-wheel drive shafts, not illustrated, are coupled to the front differential device. Front wheels 106, 106 are individually coupled to the front-wheel drive shafts. In this case, driving forces from the rotary electric machine 101 and the engine 102 are transmitted to the front wheels 106, 106 via the front differential device and the front-wheel drive shafts.

Configuration of Rotary Electric Machine

Next, referring to FIGS. 2 to 4, a configuration of the rotary electric machine 101 will be described.

Figure 2:
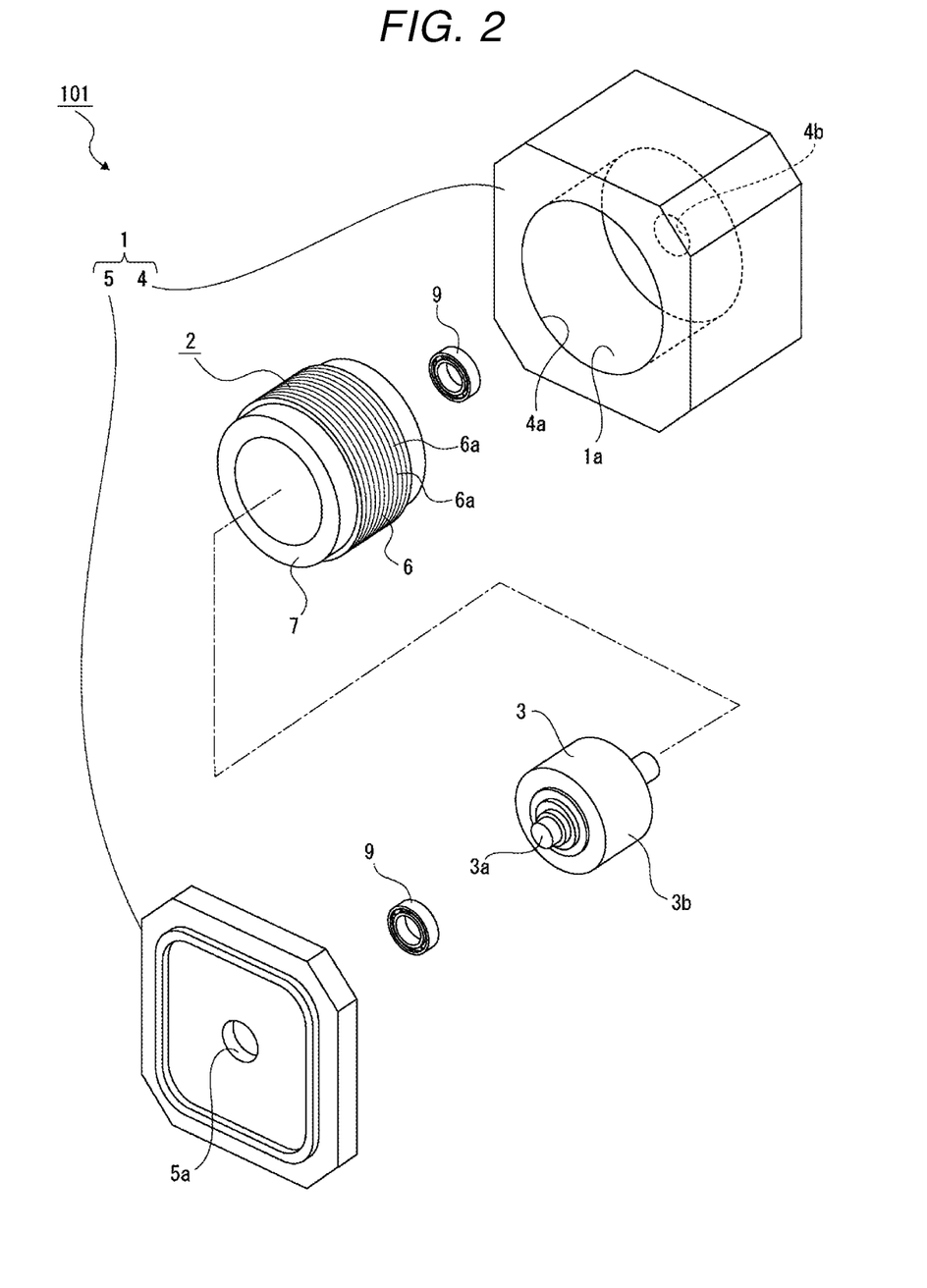
FIG. 2 is an exploded perspective view of the rotary electric machine.

The rotary electric machine 101 includes a housing 1, a stator 2, and a rotor 3 (see FIG. 2). The rotor 3 is rotated relative to the housing 1 and the stator 2.

The housing 1 includes a case 4 of a box shape opened to one side, and a cover 5 to close an opening 4a of the case 4. An internal space of the housing 1 is formed as a containing space 1a to contain the stator 2.

The case 4 has an end portion on a side opposite to the opening 4a side. A support hole 4b is formed substantially in the center of this end portion of the case 4. An annular fixing groove, not illustrated, is formed in an inner surface of the case 4 and around the support hole 4b.

A support hole 5a is formed substantially in the center of the cover 5 and extends through the cover 5 in the same direction as the support hole 4b. An annular fixing groove, not illustrated, is formed in the cover 5 and around the support hole 5a. The fixing groove is opened to the case 4 side.

Figure 3:
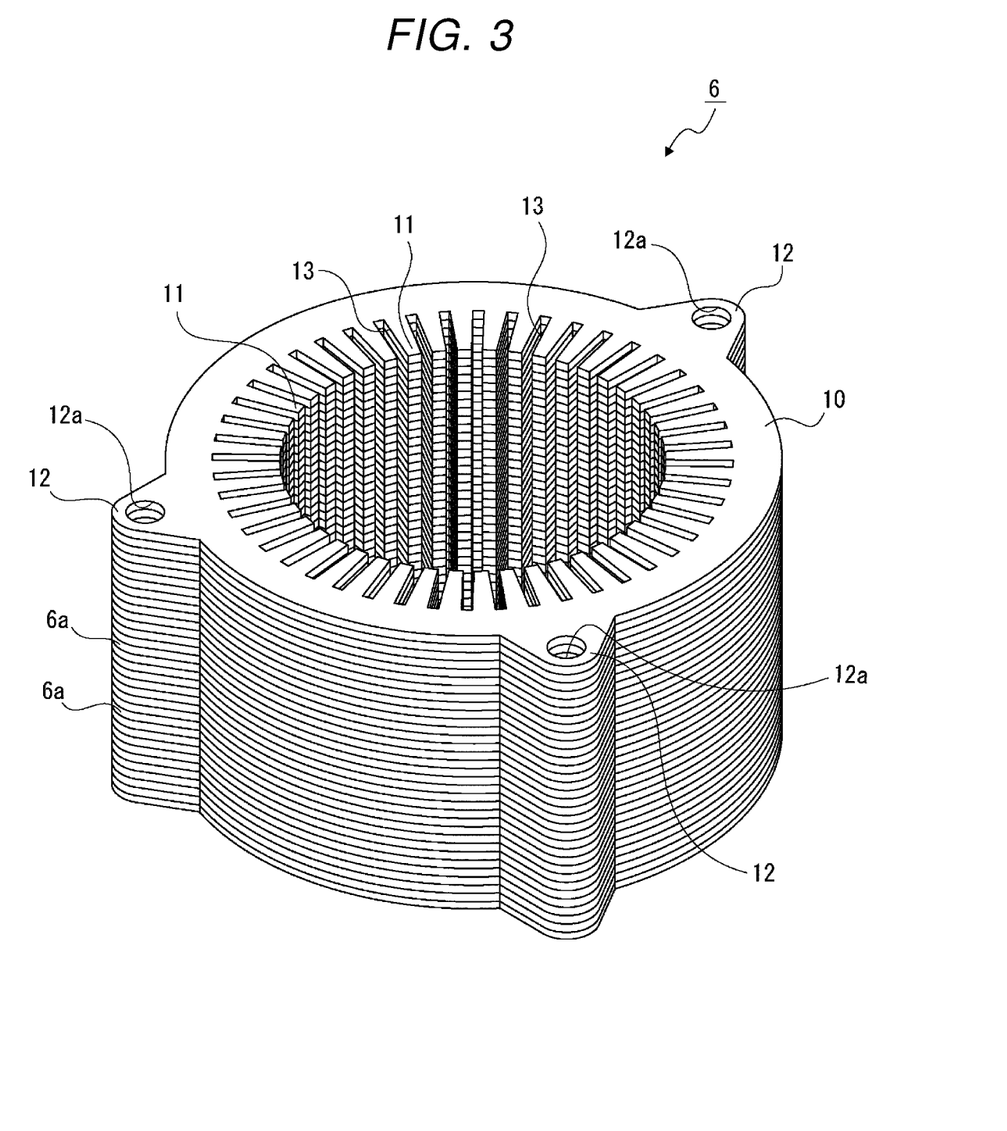
FIG. 3 is a perspective view of a stator core.
Figure 4:
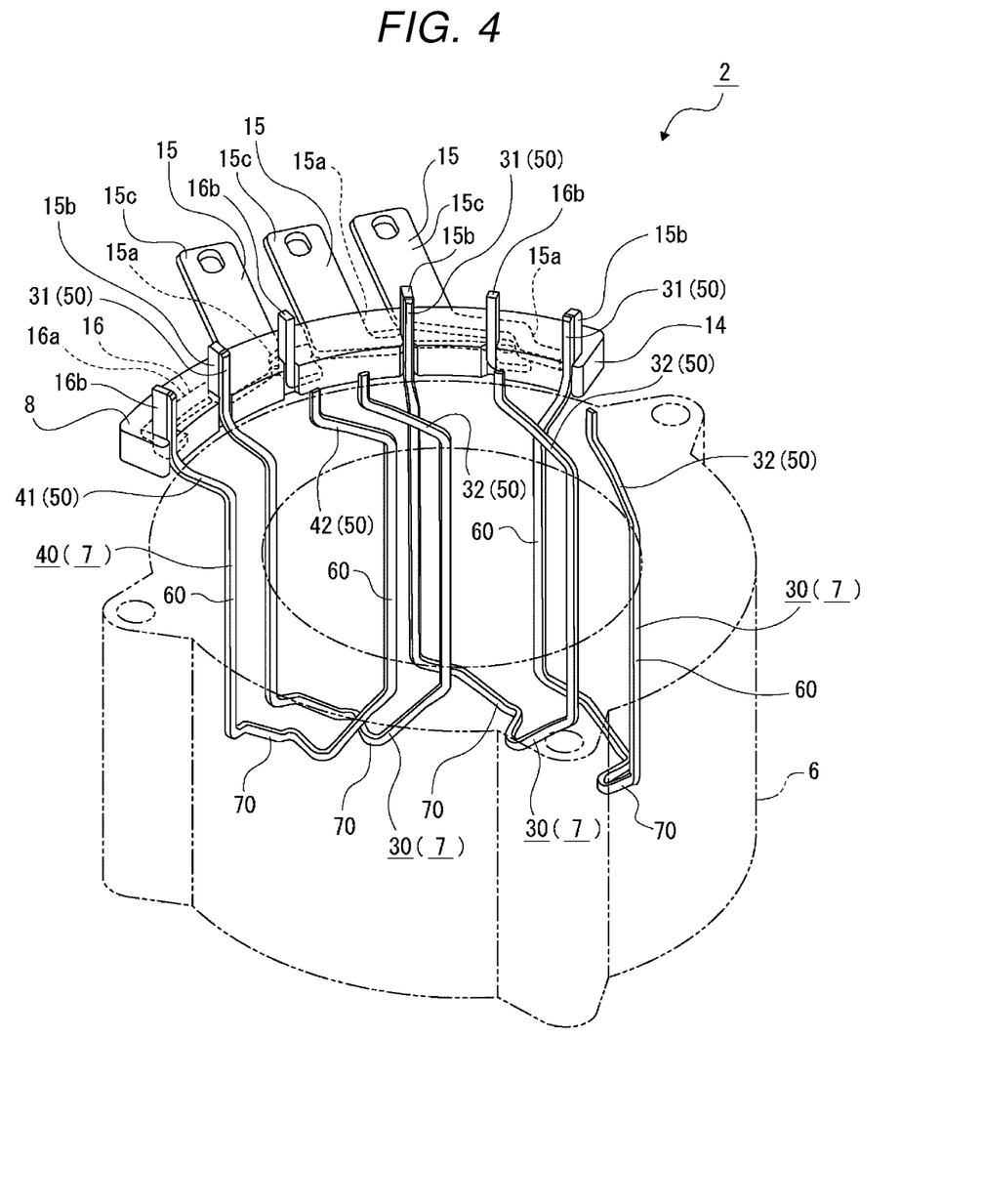
FIG. 4 is a perspective view of a bus bar unit and coils.

The stator 2 includes a stator core 6 of a hollow cylindrical shape, a plurality of coils 7 attached to the stator core 6, and a bus bar unit 8 attached to the stator core 6 (see FIGS. 2 to 4). The stator core 6 is formed of, for example, a plurality of electromagnetic steel sheets 6a stacked on one another.

The rotor 3 includes a shaft 3a serving as a pinned support, and a rotor core 3b of a hollow cylindrical shape fitted around the shaft 3a (see FIG. 2). The rotor core 3b is formed of, for example, a plurality of electromagnetic steel sheets stacked on one another. A magnetic member such as a magnet, not illustrated, is disposed inside the rotor core 3b.

The shaft 3a is supported by bearings 9, 9. The bearings 9, 9 are individually fitted in the fixing grooves formed in the case 4 and the cover 5. Housing washers of the bearings 9, 9 are fixed in the fixing grooves. Portions of the shaft 3a that are closer to opposite ends of the shaft 3a are individually inserted through the bearings 9, 9. The opposite ends of the shaft 3a are individually inserted in and supported by the support hole 4b of the case 4 and the support hole 5a of the cover 5. The bearings 9, 9 sustain a load of the rotor 3 so as to smoothly rotate the shaft 3a.

Figure 5:
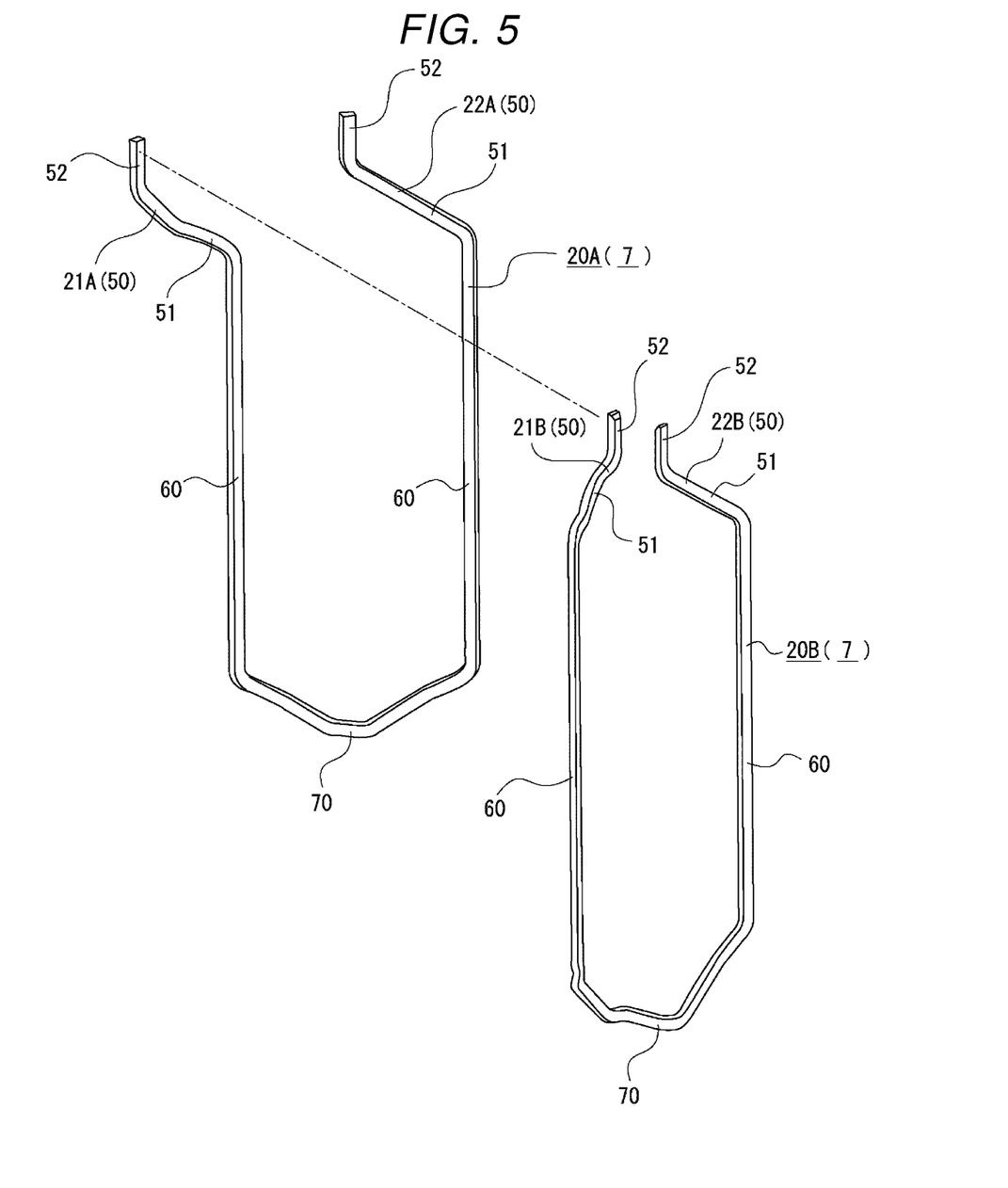
FIG. 5 is a perspective view of general coils.

Next, referring to FIGS. 3 to 5, a configuration of the stator 2 will be described in detail. As described above, the stator 2 includes the stator core 6, the plurality of coils 7, and the bus bar unit 8.

The stator core 6 includes a yoke 10 of a hollow cylindrical shape, a plurality of teeth 11 projecting from the yoke 10 in a radially inward direction, and attachment portions 12, 12, 12 projecting from the yoke 10 in a radially outward direction (see FIG. 3).

The plurality of teeth 11 are spaced at regular intervals in a circumferential direction. A space between each adjacent pair of the teeth 11, 11 in the circumferential direction is formed as a slot 13 where the coil 7 is inserted. The slot 13 is opened in an axial direction and a radially inward direction of the stator core 6.

An attachment hole 12a, 12a, 12a is formed in each of the attachment portions 12, 12, 12. The stator core 6 is attached to the housing 1 with fasteners, not illustrated, inserted through the attachment holes 12a, 12a, 12a.

The plurality of coils 7 are attached to the stator core 6 while each of the coils 7 is partly inserted in the slot 13 (see FIG. 4). It is noted that FIG. 4 illustrates some of the coils 7, 7, . . . . Each of the coils 7 serves as a U-phase coil or a V-phase coil or a W-phase coil. The coils 7 are, for example, segment conductors. The coils 7 of an identical phase are coupled to constitute each phase. A configuration of the coils 7 will be described in detail later.

The plurality of coils 7 include a plurality of general coils 20, a plurality of power-line coils 30, and a plurality of neutral-line coils 40 (see FIG. 4). A plurality of the general coils 20, a plurality of the power-line coils 30, and a plurality of the neutral-line coils 40 are provided for each phase.

The bus bar unit 8 includes a holding member 14, bus bars 15, 15, 15, and a neutral-line bus bar 16.

The holding member 14 has an arcuate shape along an outer periphery of the stator core 6. The holding member is attached to the stator core 6 with an attachment member, not illustrated, in such a manner that the holding member 14 is adjacent to one of end surfaces of the stator core 6 in the axial direction.

The bus bars 15, 15, 15 serve as the power line to couple the power source, not illustrated, to the coils 7. The bus bar 15 is provided for each phase and supplies power to the coils 7 of the U phase or the V phase or the W phase. It is noted that a connection line coupled to the power source may be provided as a power line, and the connection line may be coupled to the coils 7.

The bus bar 15 includes a held portion 15a, a coil connection terminal 15b, and an outside connection terminal 15c. The held portion 15a is held inside the holding member 14. The coil connection terminal 15b continuous to the held portion 15a projects from the holding member 14 to one side in the axial direction of the stator core 6. The outside connection terminal 15c continuous to the held portion 15a projects from the holding member 14 to the other side of the stator core 6. The power-line coil 30 of the U phase or the V phase or the W phase is coupled to the coil connection terminal 15b by welding, for example. The outside connection terminal 15c is secured to a terminal board of the power source, not illustrated, and coupled to the power source.

The neutral-line bus bar 16 forms a neutral point. The neutral-line bus bar 16 includes a held portion 16a held inside the holding member 14, and coil connection terminals 16b, 16b, 16b projecting from the held portion 16a to one side in the axial direction of the stator core 6. The neutral-line coil 40 of the U phase or the V phase or the W phase is coupled to each of the coil connection terminals 16b, 16b, 16*b* by welding, for example. It is noted that FIG. 4 illustrates the single neutral-line coil 40 coupled to the coil connection terminal 16*b*.

Figure 6:
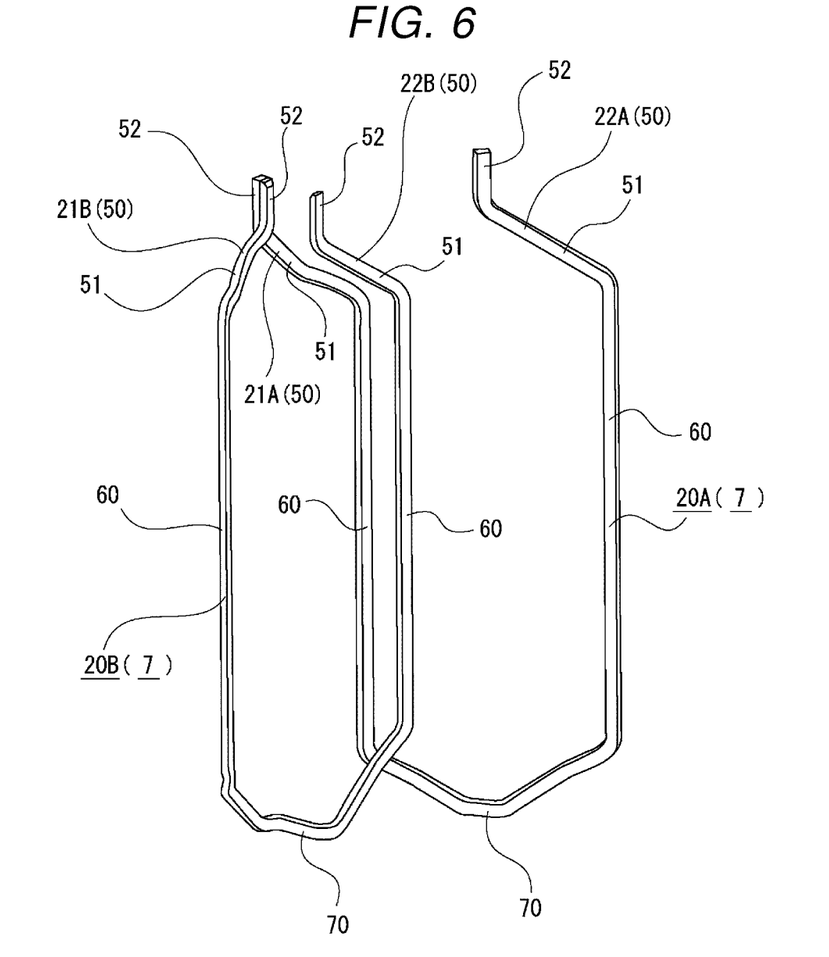
FIG. 6 is a perspective view of the general coils in a coupled state.

Next, referring to FIGS. 4 to 6, the configuration of the coil 7 will be described.

The coil 7 is formed of a flat wire cut into a predetermined length and bent in a predetermined shape.

The coil 7 is bent substantially in a U shape and partly inserted in the slot 13. The bent coil 7 includes projections 50, 50, insertion portions 60, 60, and an intermediate portion 70. The projections 50, 50 are opposite ends of the coil 7 and project from the stator core 6. The insertion portions 60, 60 are inserted into the slots 13. The intermediate portion 70 couples the insertion portions 60, 60 to each other.

The coil 7 is inserted in the slots 13 from one side of the stator core 6 in the axial direction. The coil 7 has the insertion portions 60, 60 inserted in the slots 13, 13 different from each other. A plurality of the insertion portions 60 are located in each of the slots 13 and disposed side by side in a radial direction of the stator core 6. The projections 50, 50 project from the stator core 6 in an insertion direction of the coil 7. The intermediate portion 70 projects from the stator core 6 on a side opposite to the projections 50 side.

With the coil 7 being inserted in the slots 13, each of the projections 50 of the coil 7 is bent and coupled to another of the coils 7 or the bus bar 15 or the neutral-line bus bar 16.

Referring to FIG. 4, a description will be made below on a connection state of each of the power-line coils 30 and the neutral-line coils 40.

The projections 50, 50 of the power-line coil 30 are individually provided as a power-line coupler 31 and a general coupler 32.

The power-line coupler 31 is bent from the insertion portion 60 in a radially outward direction of the stator core 6 and coupled to the coil connection terminal 15*b* of the bus bar 15. The general coupler 32 is bent from the insertion portion 60 and coupled to one of the projections 50 of the general coil 20.

The projections 50, 50 of the neutral-line coil 40 are individually provided as a neutral-line coupler 41 and a general coupler 42.

The neutral-line coupler 41 is bent from the insertion portion 60 in the radially outward direction of the stator core 6 and coupled to the coil connection terminal 16*b* of the neutral-line bus bar 16. The general coupler 42 is bent from the insertion portion 60 and coupled to one of the projections 50 of the general coil 20.

Next, referring to FIGS. 5 and 6, a connection state of the general coils 20 will be described. In FIGS. 5 and 6, a general coil 20A and a general coil 20B of different bent shapes are provided as an example. For example, the general coil 20A and the general coil 20B are shaped in different manners in accordance with a pitch difference of the slots 13, 13 where the insertion portions 60, 60 of the general coil 20A and the general coil 20B are inserted. It is noted that a plurality of kinds of the general coils 20, . . . of different lengths (overall lengths) may be used. FIGS. 5 and 6 illustrate the general coil 20A and the general coil 20B of different lengths as an example.

The projections 50, 50 of each of the general coils 20 (20A, 20B) are individually provided as a first coupler 21 and a second coupler 22. It is noted that in FIG. 5, the first coupler 21 and the second coupler 22 of the general coil 20A are respectively provided as a first coupler 21A and a second coupler 22A, and that the first coupler 21 and the second coupler 22 of the general coil 20B are respectively provided as a first coupler 21B and a second coupler 22B.

The first coupler 21 and the second coupler 22 are bent from the insertion portion 60 in the same direction or in such directions as to approach each other. Each of the projections 50 includes a first bent portion 51 and a second bent portion 52. The first bent portion 51 is continuous from the insertion portion 60 and bent from the insertion portion 60. The second bent portion 52 is continuous from the first bent portion 51 and bent from the first bent portion 51 in a direction reverse to a bending direction of the first bent portion 51.

The first coupler 21 and the second coupler 22 are coupled to the coils 7 different from each other. For example, the first coupler 21A of the general coil 20A has the second bent portion 52 coupled to the second bent portion 52 of the first coupler 21B of the general coil 20B (see FIG. 6). The second coupler 22A and the second coupler 22B have the second bent portions 52, 52 coupled to distal ends of the projections 50, 50 of other general coils 20 or the power-line coils 30 or the neutral-line coils 40.

Referring now to FIGS. 7 to 10, bent states of the projections 50, 50 of the general coil 20 will be described in detail.

In the rotary electric machine 101, the power-line coupler 31 coupled to the bus bar 15 may vary in length in accordance with a vehicle model and a configuration of the rotary electric machine 101, for example. In the rotary electric machine 101, at least one of the general coils 20 has the same length as the power-line coil 30. The first coupler 21 and the second coupler 22 of the general coil 20 and the general coupler 32 of the power-line coil 30 are bent from the insertion portions 60 by a bending amount corresponding to the length of the power-line coupler 31.

FIGS. 7 to 10 illustrate configuration examples in which the general coil 20A and the power-line coil 30 have the same length (overall length), and one of the projections 50 of the general coil 20A has the same length as the power-line coupler 31 of the power-line coil 30. It is noted that in FIGS. 7 to 10, the projection 50 and the insertion portion 60 of the general coil 20A are respectively illustrated as a projection 50A and an insertion portion 60A, and that the projection 50 and the insertion portion 60 of the general coil 20B are respectively illustrated as a projection 50B and an insertion portion 60B. It is also noted that the first bent portion 51 and the second bent portion 52 of the projection 50A are respectively illustrated as a first bent portion 51A and a second bent portion 52A, and that the first bent portion 51 and the second bent portion 52 of the projection 50B are respectively illustrated as a first bent portion 51B and a second bent portion 52B.

First, referring to FIGS. 7 and 8, a description will be made on bending states of the projection 50A of the general coil 20A and the projection 50B of the general coil 20B when the power-line coupler 31 is long.

Figure 7:
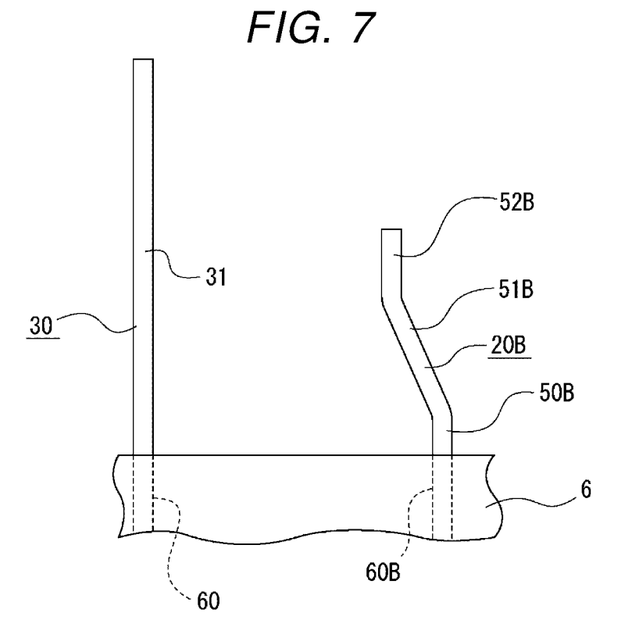
FIG. 7 is a conceptual diagram illustrating components such as a power-line coupler of a power-line coil.

FIG. 7 illustrates the power-line coupler 31 of the power-line coil 30 and one of the projections 50B of the general coil 20B. It is noted that although the general coil 20B illustrated in FIG. 7 is not the coil 7 coupled to the power-line coil 30, FIG. 7 illustrates the same general coil 20B as the general coil 20B illustrated in FIG. 8 so as to facilitate understanding in comparison with FIG. 8. In an example illustrated in FIG. 7, the power-line coupler 31 is longer than the projection 50B of the general coil 20B. The power-line coupler 31 has such a length that the power-line coupler 31 is couplable to the coil connection terminal 15*b* of the bus bar 15. The power-line coupler 31 is bent in a predetermined shape and has a distal end coupled to the coil connection terminal 15*b*. The general coupler 32, not illustrated, of the power-line coil 30 has the same length as the power-line coupler 31, for example. The general coupler 32 is bent in the same shape as the projection 50A, described later, and has a distal end coupled to the general coil 20.

Figure 8:
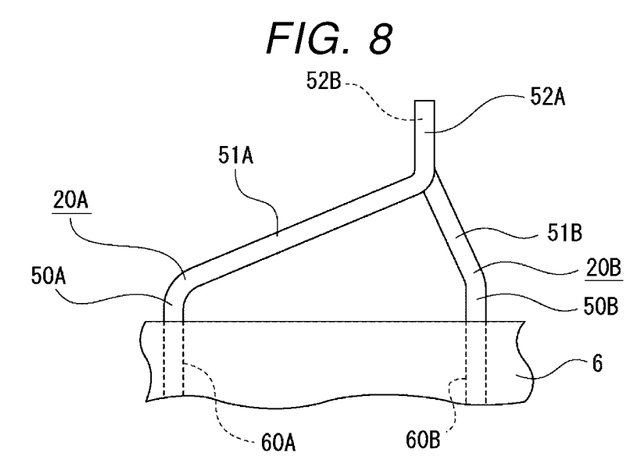
FIG. 8 is a conceptual diagram illustrating a bent state of the general coils.

FIG. 8 illustrates a state where the projection 50A of the general coil 20A and the projection 50B of the general coil 20B are coupled to each other. As described above, the general coil 20A and the power-line coil 30 have the same length. For example, the projection 50A has the same length as the power-line coupler 31 elongated, and the projection 50A is longer than the projection 50B of the general coil 20B.

The projection 50A and the projection 50B are bent in such directions as to approach each other, and the second bent portion 52A of the projection 50A and the second bent portion 52B of the projection 50B are joined by welding, for example. Thus, the general coil 20A and the general coil 20B are coupled to each other.

A bending amount of the first bent portion 51A of the projection 50A is larger than a bending amount of the first bent portion 51B of the projection 50B. With this configuration, the general coil 20A and the general coil 20B are coupled at a position closer to the projection 50B. Consequently, while decreasing projection amounts of the projection 50A and the projection 50B in a coupled state from the stator core 6 in the axial direction, the two projections 50, 50 can be appropriately coupled to each other.

The second bent portion 52A of the projection 50A has the same length as the second bent portion 52B of the projection 50B. With this configuration, the second bent portions 52A, 52B of the same length are coupled in such a manner that the second bent portions 52A, 52B can wholly overlap each other to prevent one of the second bent portions 52 from projecting from the other of the second bent portions 52. This makes it possible to further decrease the projection amounts of the coupled second bent portions 52A, 52B from the stator core 6 in the axial direction.

It is noted that the other projection 50A, not illustrated, of the general coil 20A and the other projection 50B, not illustrated, of the general coil 20B are respectively bent in the same shapes as the illustrated projection 50A and the illustrated projection 50B and coupled to distal ends of other general coils 20 or the power-line coils 30 or the neutral-line coils 40.

Next, referring to FIGS. 9 and 10, a description will be made on bending states of the projection 50A of the general coil 20A and the projection 50B of the general coil 20B when the power-line coupler 31 is short.

Figure 9:
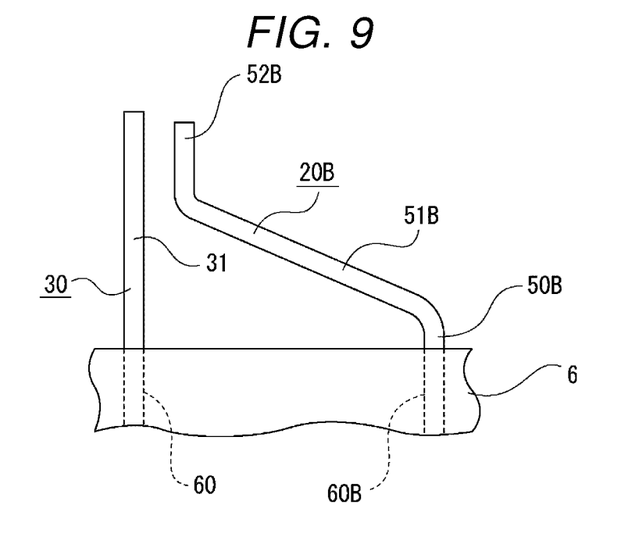
FIG. 9 is a conceptual diagram illustrating components such as a power-line coupler of another power-line coil.

FIG. 9 illustrates the power-line coupler 31 of the power-line coil 30 and one of the projections 50B of the general coil 20B. It is noted that although the general coil 20B illustrated in FIG. 9 is not the coil 7 coupled to the power-line coil 30, FIG. 9 illustrates the same general coil 20B as the general coil 20B illustrated in FIG. 10 so as to facilitate understanding in comparison with FIG. 10. In an example illustrated in FIG. 9, the power-line coupler 31 is shorter than the projection 50B of the general coil 20B. The power-line coupler 31 has such a length that the power-line coupler 31 is couplable to the coil connection terminal 15b. The power-line coupler 31 is bent in a predetermined shape and has a distal end coupled to the coil connection terminal 15b. The general coupler 32, not illustrated, of the power-line coil 30 has the same length as the power-line coupler 31, for example. The general coupler 32 is bent in the same shape as the projection 50A, described later, and has a distal end coupled to the general coil 20.

Figure 10:
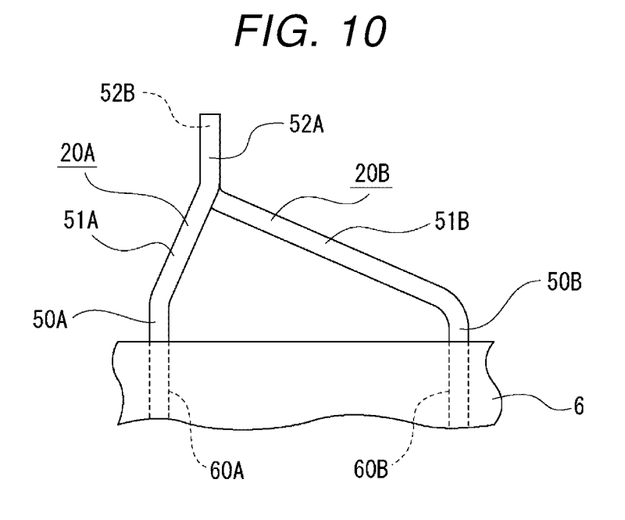
FIG. 10 is a conceptual diagram illustrating a bent state of other general coils.

FIG. 10 illustrates a state where the projection 50A of the general coil 20A and the projection 50B of the general coil 20B are coupled to each other. As described above, the general coil 20A and the power-line coil 30 have the same length. For example, the projection 50A has the same length as the power-line coupler 31 shortened, and the projection 50A is shorter than the projection 50B of the general coil 20B.

The projection 50A and the projection 50B are bent in such directions as to approach each other, and the second bent portion 52A of the projection 50A and the second bent portion 52B of the projection 50B are joined by welding, for example. Thus, the general coil 20A and the general coil 20B are coupled to each other.

A bending amount of the first bent portion 51A of the projection 50A is smaller than a bending amount of the first bent portion 51B of the projection 50B. With this configuration, the general coil 20A and the general coil 20B are coupled at a position closer to the projection 50A. Consequently, while decreasing projection amounts of the projection 50A and the projection 50B in a coupled state from the stator core 6 in the axial direction, the two projections 50, 50 can be appropriately coupled to each other.

The second bent portion 52A of the projection 50A has the same length as the second bent portion 52B of the projection 50B. With this configuration, the second bent portions 52A, 52B of the same length are coupled in such a manner that the second bent portions 52A, 52B can wholly overlap each other to prevent one of the second bent portions 52 from projecting from the other of the second bent portions 52. This makes it possible to further decrease the projection amounts of the coupled second bent portions 52A, 52B from the stator core 6 in the axial direction.

It is noted that the other projection 50A, not illustrated, of the general coil 20A and the other projection 50B, not illustrated, of the general coil 20B are respectively bent in the same shapes as the illustrated projection 50A and the illustrated projection 50B and coupled to distal ends of other general coils 20 or the power-line coils 30 or the neutral-line coils 40.

CONCLUSIONS

As has been described heretofore, in the rotary electric machine 101, at least one of the general coils 20 has the same length as the power-line coil 30, and the first coupler 21 (projection 50), the second coupler 22 (projection 50), and the general coupler 32 are bent from the insertion portions 60 by bending amounts corresponding to the length of the power-line coupler 31, and coupled to the other coils 7.

With this configuration, the bending amounts of the first coupler 21, the second coupler 22, and the general coupler 32 vary in accordance with the length of the power-line coupler 31 so that the coils 7 can be coupled to one another irrespective of the length of the power-line coupler 31. Therefore, none of the power-line coils 30 and none of the general coils 20 are to be provided as the coils 7 having different lengths so that the number of kinds of the coils 7 for use in the rotary electric machine 101 can be decreased to reduce the number of manufacturing steps and manufacturing cost of the rotary electric machine 101.

In the rotary electric machine 101, the first coupler 21 and the power-line coupler 31 have the same length. With this configuration, the length of the first coupler 21 is determined in accordance with the length of the power-line coupler 31 so that the bending amount of the first coupler 21 can be easily determined to facilitate designing the rotary electric machine 101.

In the rotary electric machine 101, the longer the power-line coupler 31 is, the larger the bending amount of the first coupler 21 is. With this configuration, as the length of the power-line coupler 31 increases, the first coupler 21 is bent more largely so that the general coil 20 can be appropriately coupled to the other coils 7 irrespective of the length of the power-line coupler 31.

In the rotary electric machine 101, concerning two of the projections 50, 50 coupled between the general coils 20, a first one of the projections 50 (projection 50A) is different in length from a second one of the projections 50 (projection 50B). Concerning the first projection 50 and the second projection 50, a bending amount of a longer one of the first and second projections 50 is larger than a bending amount of a shorter one of the first and second projections 50. With this configuration, the first projection 50 and the second projection 50 are coupled at a position closer to the shorter one of the projections 50. Consequently, the projection amounts of the first projection 50 and the second projection 50 in a coupled state from the stator core 6 can be decreased to reduce the rotary electric machine 101 in size.

In the rotary electric machine 101, each of the projections 50 includes the first bent portion 51 bent from the insertion portion 60, and the second bent portion 52 bent from the first bent portion 51, and the general coils 20, 20 are coupled to each other with the second bent portions 52, 52 having the same length. With this configuration, the second bent portions 52, 52 of the same length are coupled in such a manner that the second bent portions 52, 52 can wholly overlap each other to prevent one of the second bent portions 52 from projecting from the other of the second bent portions 52. This makes it possible to further decrease the projection amounts of the first projection 50 and the second projection 50 in a coupled state from the stator core 6 so as to promote size reduction of the rotary electric machine 101.

The invention claimed is:

1. A rotary electric machine comprising:
   a stator; and
   a rotor rotatable relative to the stator,
   wherein the stator comprises:
      a stator core comprising slots spaced in a circumferential direction;
      coils individually inserted in the slots and attached to the stator core; and
      a power line configured to couple a power source to the coils,
   wherein each of the coils comprises:
      projections that are opposite ends of the each of the coils, the projections projecting from the stator core; and
      insertion portions that are portions of the each of the coils, the insertion portions being inserted in corresponding ones of the slots,
   wherein the coils comprise:
      general coils; and
      power-line coils,
   wherein the general coils include a first general coil and a second general coil, a total length of the first general coil and a total length of the second general coil being different,
   wherein the total length of the first general coil and a total length of each of the power-line coils are equal,
   wherein the projections of the first general coil are configured to serve as a first coupler and a second coupler,
   wherein the projections of the second general coil are configured to serve as a third coupler and a fourth coupler,
   wherein the projections of each of the power-line coils are configured to serve as a power-line coupler and a general coupler,
   wherein a length of the power-line coupler, a length of the general coupler before bending, a length of the first coupler before bending, and a length of the second coupler before bending are equal,
   wherein the power-line coupler is coupled to the power line,
   wherein the first coupler is coupled to the third coupler directly, and
   wherein a bending amount of the general coupler, a bending amount of the first coupler, and a bending amount of the second coupler are equal.

2. The rotary electric machine according to claim 1, wherein the bending amount of the first coupler corresponding to the length of the power-line coupler increases as the length of the power-line coupler increases.

3. The rotary electric machine according to claim 2, wherein the length of the power-line coupler is longer than the length of the third coupler before bending, and
   wherein the bending amount of the first coupler is larger than the bending amount of the third coupler.

4. The rotary electric machine according to claim 3, wherein each of the projections comprises:
   a first bent portion bent from the insertion portion, and
   a second bent portion bent from the first bent portion, and
   wherein the first general coil and the second general coil are coupled to each other with the second bent portions being same in length.

5. The rotary electric machine according to claim 1, wherein each of the projections comprises:
   a first bent portion bent from the insertion portion, and
   a second bent portion bent from the first bent portion, and
   wherein the first general coil and the second general coil are coupled to each other with the second bent portions being same in length.

6. The rotary electric machine according to claim 1, wherein the length of the power-line coupler is shorter than the length of the third coupler before bending, and
   wherein the bending amount of the first coupler is smaller than the bending amount of the third coupler.

7. A rotary electric machine comprising:
   a stator; and
   a rotor rotatable relative to the stator,
   wherein the stator comprises:
      a stator core comprising slots spaced in a circumferential direction;
      coils individually inserted in the slots and attached to the stator core; and
      a power line configured to couple a power source to the coils,
   wherein each of the coils comprises:
      projections that are opposite ends of the each of the coils, the projections projecting from the stator core; and
      insertion portions that are portions of the each of the coils, the insertion portions being inserted in corresponding ones of the slots,
   wherein the coils comprise:
      general coils; and
      power-line coils, wherein the general coils include a first general coil and a second general coil, a total length of the first general coil and a total length of the second general coil being different, wherein the total length of the first general coil and a total length of each of the power-line coils are equal, wherein the projections of the first general coil are configured to serve as a first coupler and a second coupler, wherein the projections of the second general coil are configured to serve as a third coupler and a fourth coupler, wherein the projections of each of the power-line coils are configured to serve as a power-line coupler and a general coupler, wherein a length of the power-line coupler, a length of the general coupler before bending, a length of the first coupler before bending, and a length of the second coupler before bending are equal, wherein the power-line coupler is coupled to the power line, wherein the first coupler is coupled to the third coupler directly, wherein a bending amount of the general coupler, a bending amount of the first coupler, and a bending amount of the second coupler are equal, wherein the length of the power-line coupler is longer than the length of the third coupler before bending, and wherein the bending amount of the first coupler is larger than the bending amount of the third coupler.

* * * * *